US008515797B2

(12) United States Patent
Ernst et al.

(10) Patent No.: US 8,515,797 B2
(45) Date of Patent: Aug. 20, 2013

(54) METHOD FOR OPERATING A MULTIPROCESSOR COMPUTER SYSTEM

(75) Inventors: Rolf Ernst, Braunschweig (DE); Jonas Diemer, Braunschweig (DE)

(73) Assignee: Technische Universitaet Braunschweig Carolo-Wilhelmina, Braunschweig (DE)

( * ) Notice: Subject to any disclaimer, the term of this patent is extended or adjusted under 35 U.S.C. 154(b) by 348 days.

(21) Appl. No.: 12/757,411

(22) Filed: Apr. 9, 2010

(65) Prior Publication Data

US 2010/0262973 A1 Oct. 14, 2010

(30) Foreign Application Priority Data

Apr. 9, 2009 (DE) .................. 10 2009 016 742

(51) Int. Cl.
*G06F 9/46* (2006.01)
(52) U.S. Cl.
USPC ....................................................... 705/7.24
(58) Field of Classification Search
USPC ....................................................... 705/7.24
See application file for complete search history.

(56) References Cited

U.S. PATENT DOCUMENTS

| 5,978,363 | A | 11/1999 | Dimitrijevic et al. | |
|---|---|---|---|---|
| 6,282,561 | B1 * | 8/2001 | Jones et al. | 718/104 |
| 6,748,364 | B1 * | 6/2004 | Waytena et al. | 705/5 |
| 7,209,439 | B2 * | 4/2007 | Rawlins et al. | 370/230 |
| 7,694,082 | B2 * | 4/2010 | Golding et al. | 711/154 |

FOREIGN PATENT DOCUMENTS

| DE | 199 83 709 | 2/2007 |
|---|---|---|
| DE | 10 2006 019 839 | 3/2007 |

OTHER PUBLICATIONS

Ray, S., et. al., "A Reconfigurable Bus Structure for Multiprocessors with Bandwidth Reuse", Journal of Systems Architecture, vol. 45, No. 11. May 1999. pp. 847-862.

* cited by examiner

*Primary Examiner* — Romain Jeanty
(74) *Attorney, Agent, or Firm* — Whitham Curtis Christofferson & Cook, PC

(57) ABSTRACT

The invention relates to a method for operating a multiprocessor computer system which has at least two microprocessors (102) and resources (103, 104, 105, 106, 107, 108) which are jointly used by the microprocessors, programs (403) being able to be executed on the computer system, characterized by at least one resource manager (101) with the following features:
a) the resource manager (101) manages resources (103, 104, 105, 106, 107, 108) which are assigned to said manager and can be adjusted at least in terms of their time response,
b) the resource manager (101) receives and processes reservation requests (401) for reserving desired resources (103, 104, 105, 106, 107, 108), which reservation requests are transmitted by programs (403),
c) the reservation requests (401) describe at least the type, scope and time response of the desired resources (103, 104, 105, 106, 107, 108),
d) the resource manager (101) allocates the respectively desired resources (103, 104, 105, 106, 107, 108) to the requesting program (403) if said resources are available,
e) the resource manager (101) adjusts the time response of the allocated resources (103, 104, 105, 106, 107, 108) according to the time response requested with the reservation request (401).

19 Claims, 5 Drawing Sheets

METHOD FOR OPERATING A MULTIPROCESSOR COMPUTER SYSTEM

Figure 1:
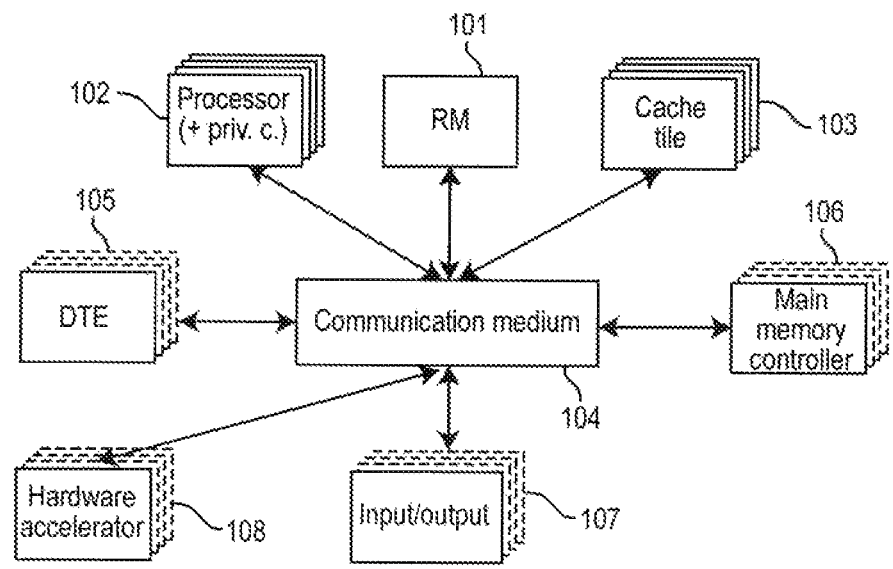

The invention relates to a method for operating a multiprocessor computer system according to the precharacterizing clause of Patent Claim 1. An advantageous multiprocessor computer system for carrying out the method is also specified.

Multiprocessor computer systems have the characteristic that the available system resources are jointly used by the microprocessors. In the case of known multiprocessor computer systems, this results in the execution time for programs varying on account of the utilization of the resources, which cannot be accurately predicted, and therefore being difficult to predict.

Resources of a computer system are understood as meaning, for example, hardware components such as the main memory, communication media (for example a data bush input and output channels, cache memories and possibly other hardware and software components used, including hardware components which may be on the same chip as the processors.

In particular fields of application of contemporary and future computer systems (for example multimedia), it is necessary to predict the execution time of software programs or parts of the latter as exactly as possible in order to meet real-time requirements, for example, or to optimize the program flow. This execution time is concomitantly determined by operations for accessing a complex memory hierarchy which is composed of one or more main memory controllers and/or other input/output interfaces, one or more communication media (for example in the form of a network-on-chip; NoC) and a hierarchy respectively comprising one or more cache memories for each hierarchy level. The cache memories, in particular, have a highly dynamic response, which makes it very difficult to predict the time response.

In addition, in multiprocessor computer systems, the components of the memory hierarchy may be jointly used by a plurality of microprocessors and therefore also by independent software programs, which may result in access conflicts which may likewise greatly influence the time response of program execution operations. This influence depends not only on the response of an individual software program but also on the response of other software programs which are executed at the same time and on how individual resources resolve their respective access conflicts. The mutual influence can therefore be predicted only very inaccurately in the known multiprocessor computer systems, with the result that the run time of the software programs is overestimated when accessing joint resources since, with a conservative estimate, the greatest possible degree of influence must always be assumed. This results in either the system being greatly oversized or in the software programs not being able to be executed with a guaranteed time response. In other words, if it is possible to reserve all required resources in such a manner that any influence is impossible, it would not be necessary to overestimate the run time. In current multiprocessor computer systems, the available resources are thus poorly used if the intention is to be able to accurately predict the time response of the applications.

In so-called embedded systems with real-time requirements, it is known practice to permanently assign the resources to particular microprocessors or programs in order to avoid corresponding conflicts. Instead of cache memories, software-managed memories, so-called scratch-pad memories (SPM, cf. document D1 in the bibliography), which have a simple deterministic time response are preferably used there. Although this makes it possible to meet the real-time requirements in a relatively effective manner, the system is generally rather application-specific and is not suitable for universal use. Such a system is not suitable, in particular, for efficient use for more general tasks, for example in desktop and server systems. In addition, such adaptations usually result in inefficient system use.

Therefore, the invention is based on the object of specifying a method for operating a multiprocessor computer system having resources which are jointly used by the microprocessors, which method allows a deterministic time response of the programs executed on the computer system. Therefore, the intention is to be able to predict the execution time of programs.

This object is achieved by means of the invention specified in a method for operating a multiprocessor computer system which has at least two microprocessors and resources (103, 104, 105, 106, 107, 108) which are jointly used by the microprocessors, programs (403) being able to be executed on the computer system, characterized by at least one resource manager (101) with the following features: a) the resource manager (101) manages resources (103, 104, 105, 106, 107, 108) which are assigned to said manager and can be adjusted at least in terms of their time response, b) the resource manager (101) receives and processes reservation requests (401) for reserving desired resources (103, 104, 105, 106, 107, 108), which reservation requests are transmitted by programs (403), c) the reservation requests (401) describe at least the type, scope and time response of the desired resources (103, 104, 105, 106, 107, 108), d) the resource manager (101) allocates the respectively desired resources (103, 104, 105, 106, 107, 108) to the requesting program (403) if said resources are available, e) the resource manager (101) adjusts the time response of the allocated resources (103, 104, 105, 106, 107, 108) according to the time response requested with the reservation request (401). Further, the invention specifies an advantageous multiprocessor computer system for carrying out the method according to the invention. And, the invention further provides a communication medium for such a computer system.

The invention has the advantage of making it possible to allocate all required resources in a defined way and in a manner which can be configured at the run time of the computer system and therefore can be configured by programs. This makes it possible to predict the time response of access operations, in particular operations for accessing the memory hierarchy. In addition, it is possible to transport data in the background in an efficient and predictable manner. In this case, the essence of the invention is a central resource manager (RM) which coordinates the allocation of resources. The resource manager may be implemented as a separate hardware component of the computer system, as a software program, in particular as part of the runtime environment, or as a combination thereof. An implementation of the resource manager as a hardware component is also advantageously possible in the form of an implementation on the same chip as the processors, that is to say on a multiprocessor-system-on-chip or a chip multiprocessor.

The resource manager advantageously manages resources which are assigned to said manager and can be adjusted at least in terms of their time response. By introducing reservation requests which, in addition to the type and scope of desired resources to be reserved, also describe the time response of said resources, the resource manager is able to manage the resources also with regard to the execution times of programs. The resource manager advantageously adjusts the time response of the allocated resources according to the requested time response of a reservation request. As a result, the resource manager guarantees a defined execution time, as requested in the reservation request, and thus a deterministic time response of those programs which carry out reservation operations.

The parameters of a reservation request, namely at least the type, scope and time response, are defined in this case depending on the desired resource. If a cache memory, for example, is requested as the type of resource, the desired memory size in KB or MB is stated as the scope. The access latency is stated as the time response. If a communication medium is requested as the type of resource, the volume of data to be transmitted (for example in MB) is stated as the scope and the desired transmission time or, in the case of repeated transmission, the transmission rate and latency is/are stated as the time response. The operation of adjusting the time response also includes the practice of handling access conflicts when resources are jointly used by a plurality of processors. For this purpose, the resources can be adjusted for such handling of access conflicts, for example in such a manner that the available capacity of a resource is proportionately assigned to different processors or requesting programs.

In one advantageous refinement of the invention, the resource manager can reserve more than one resource for each reservation request. This has the advantage that the reservation requests may contain a functional description of the desired resources and need not necessarily be hardware-specific. For example, a reservation request need not necessarily contain the request that a particular memory location size with a particular access time and particular communication media access times are reserved. Rather, the reservation request may contain a functional description of the desired resources, for instance for playing back a multimedia file. The resource manager then automatically selects the required resources, for example cache memories for intermediate storage, communication media access times and input/output channels, adjusts said resources according to the required time response and reserves the corresponding capacities of these hardware resources.

According to one advantageous development of the invention, the reservation requests describe virtual resources. The resource manager automatically selects and allocates those real resources which are needed to satisfy a reservation request. A virtual resource may be, for example, a virtual processor, that is to say a particular computation capacity of a real microprocessor of the hardware. Providing such virtual resources allows the user or the programmer to develop the programs largely independently of the particular hardware equipment of the multiprocessor computer system since the resource manager automatically deals with the assignment and the management of real hardware resources.

According to one advantageous development of the invention, the resource manager has a system model which describes the type, scope and time response of at least the resources managed by the resource manager. The use of the system model has the advantage, that it becomes possible to manage resources in a simple and efficient manner. In particular, changes in the hardware configuration of the multiprocessor computer system are also unproblematic since only the system model has to be updated with regard to the resource manager. The system model reflects, as it were, a replica of the system. The system model may be stored in a flash memory, for example.

According to one advantageous development of the invention, virtual resources which contain virtual scratch-pad memories (SPM) with direct memory access (DMA) are provided as resources. The programming model for scratch-pad memories with DMA transfers which is used in the field of embedded systems is advantageously used, that is to say a virtual scratch-pad memory which can be accessed via a DMA controller is provided in the cache. The resource manager provides the programs with an interface for reserving virtual components with deterministic properties, for example a virtual scratch-pad memory with a fixed size and guaranteed access bandwidth and latency or a virtual DMA transfer between the virtual scratch-pad memory and the main memory with a guaranteed maximum execution duration. This makes it possible to generate virtual embedded subsystems with a defined time response inside the overall system.

According to one advantageous development, the resources managed by the resource manager have at least one communication medium, for example a data bus, a memory or memory controller, a hardware accelerator and/or at least one input and/or output unit. This makes it possible to use the method according to the invention in a flexible manner in a multiplicity of differently equipped multiprocessor computer systems.

The practice of allocating the resources by means of a central resource manager has the following advantages:

The resource manager can use a system model and the knowledge of existing reservations to check whether a reservation request can be satisfied at all. In this case, the resource manager can carry out prioritization and, if necessary, can cancel reservations which have already been granted in order to satisfy a more important reservation request.

If the response of a reserving program is defective, the resource manager can cancel reservations and thus release resources again.

If a reservation request cannot be satisfied, the resource manager can negotiate alternative reservations with the requesting program.

If the system workload is known (for example as a result of a performance counter), the resource manager can optimize the system performance for a reservation. For this purpose, the resource manager can negotiate alternative reservations with a requesting program if necessary.

The resource manager constitutes an abstraction level for the program in that an interface which is independent of the actual implementation of resource allocation is provided.

Figure 2:
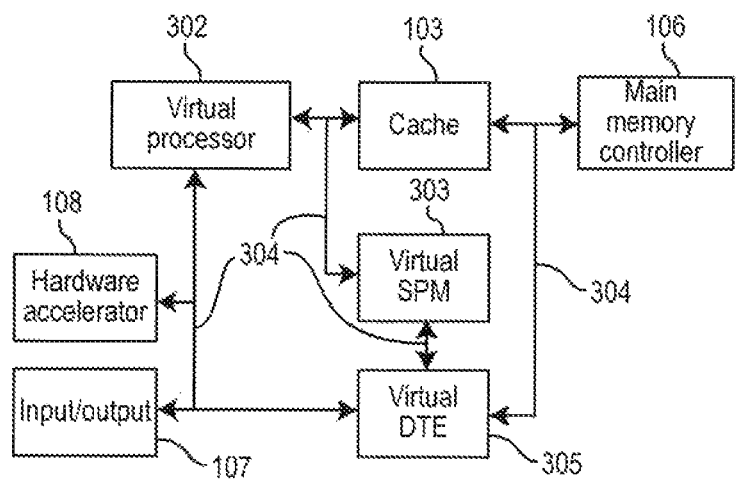
Figure 3:
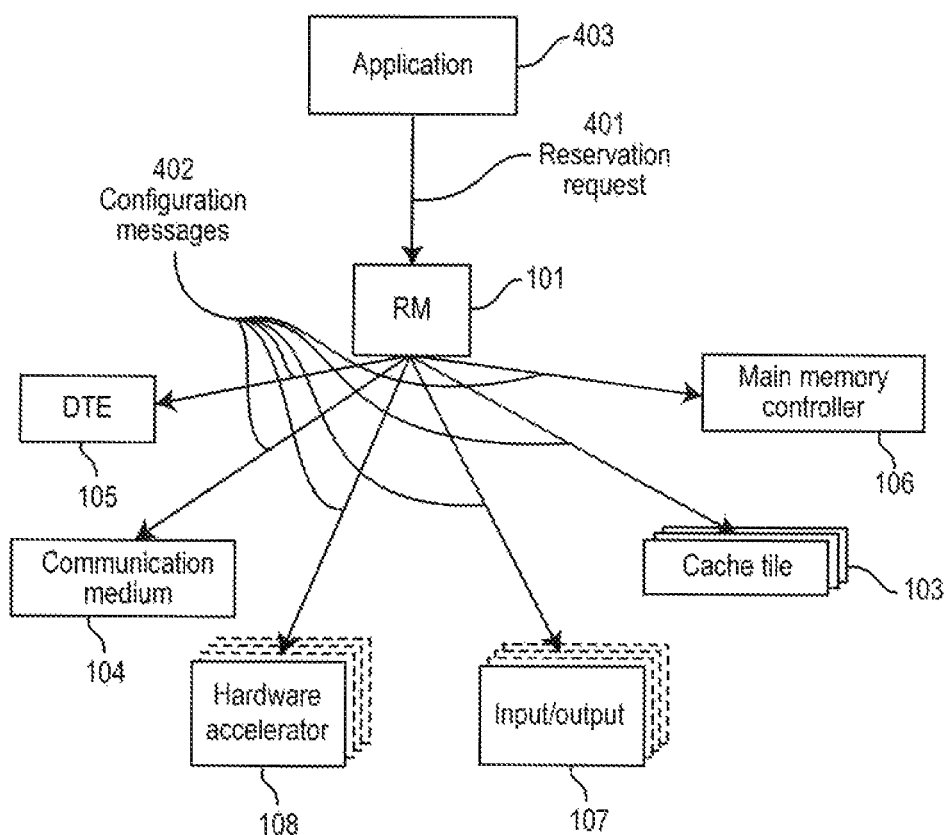
Figure 4:
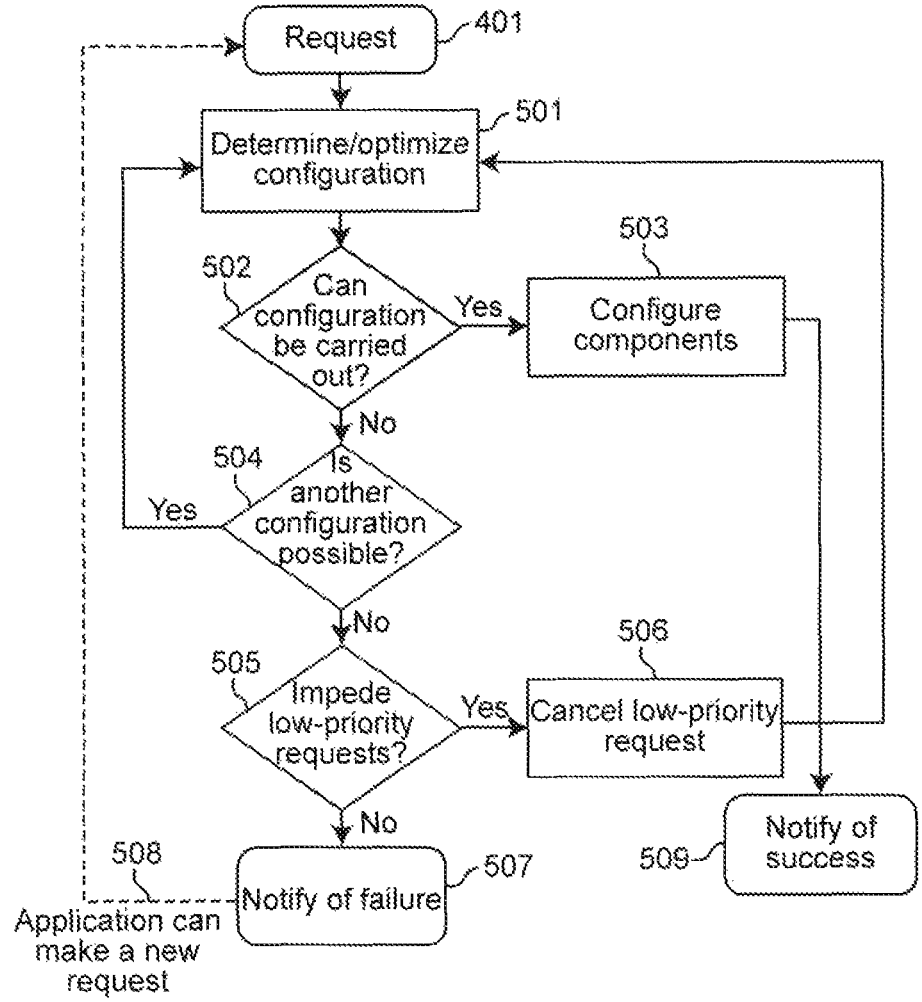
Figure 5:
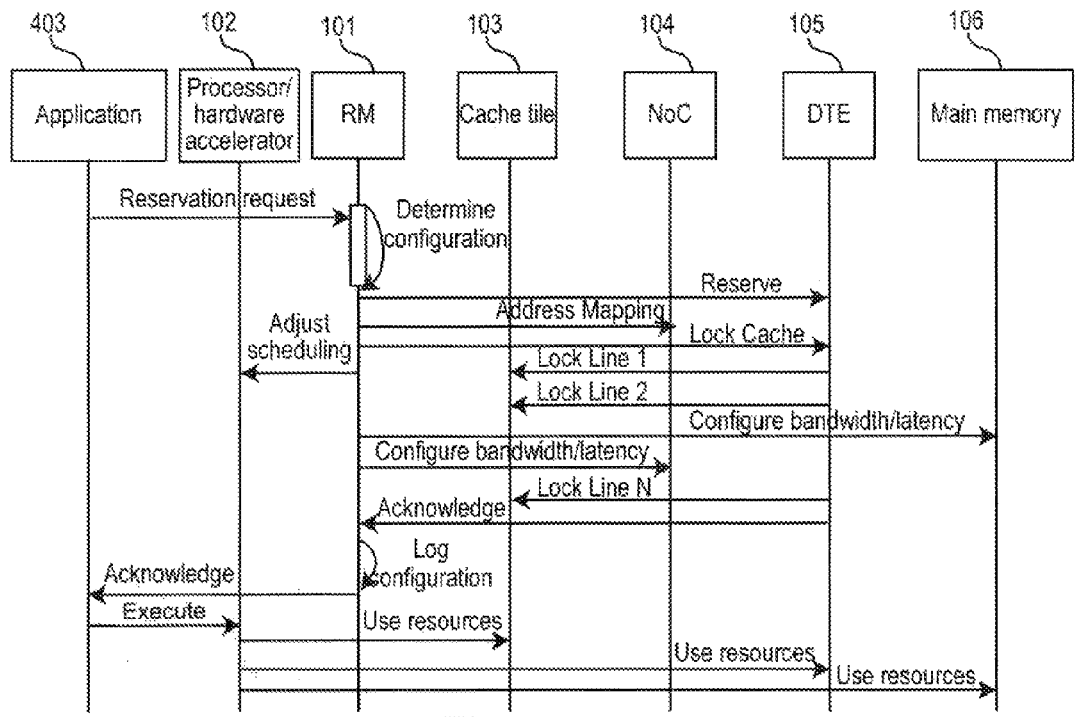
Figure 6:
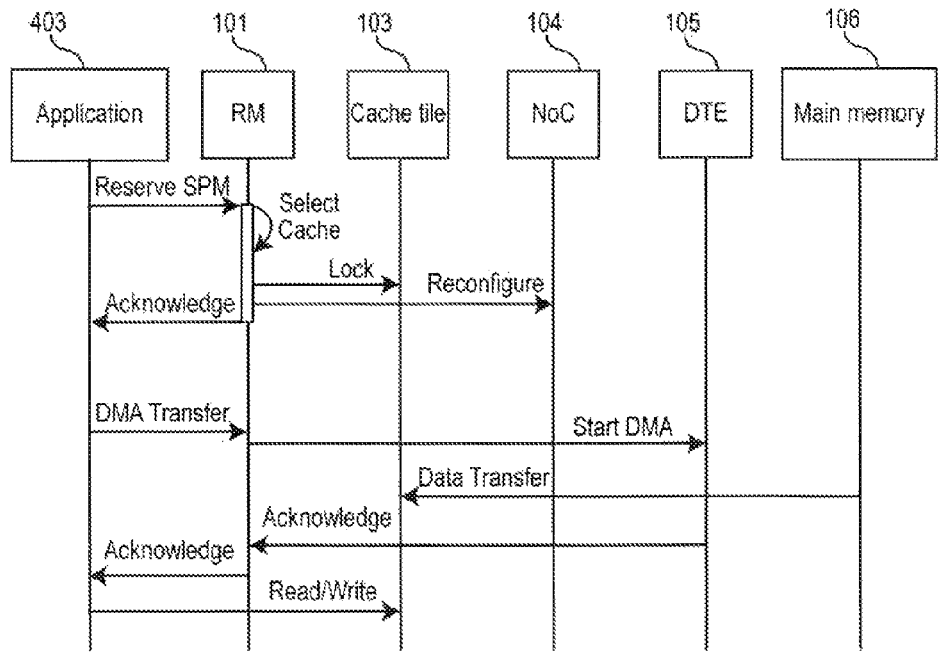
Figure 7:
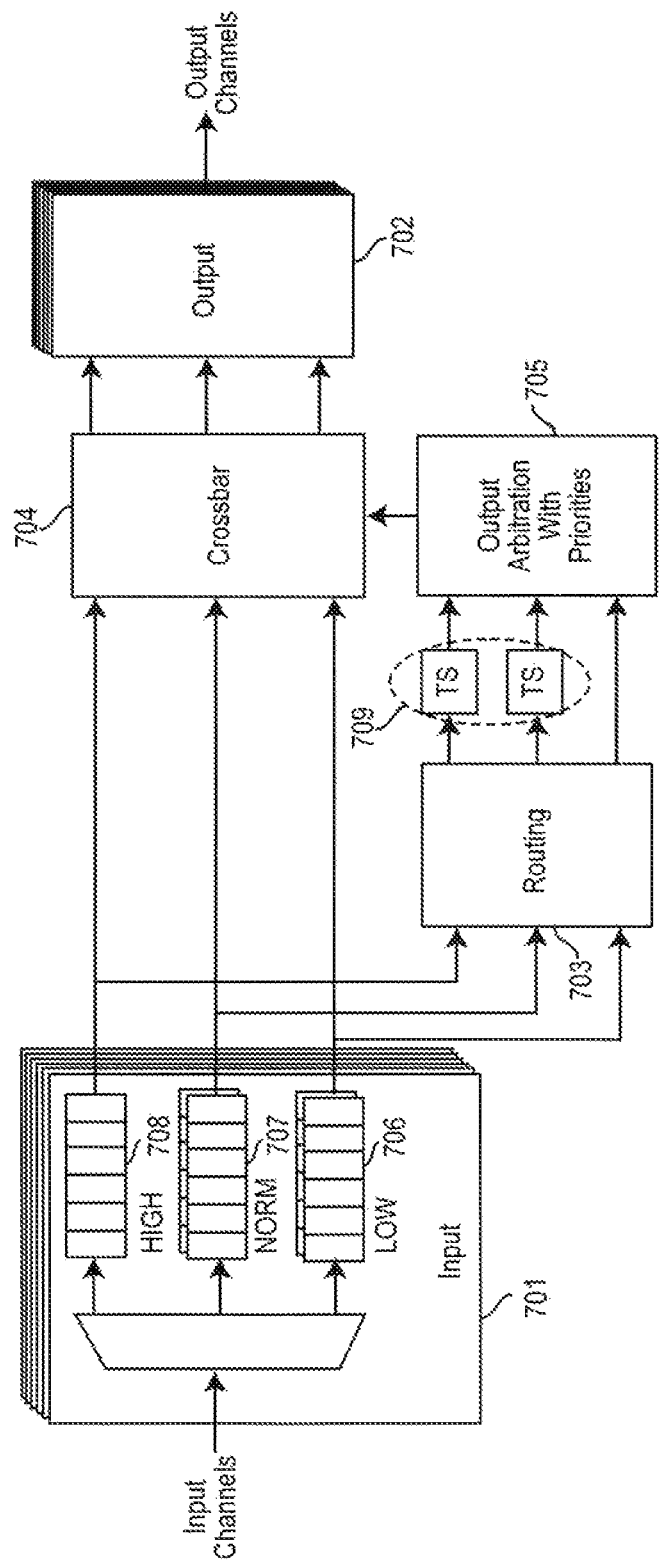

The invention is explained in more detail below with reference to exemplary embodiments and using drawings, in which:

FIG. 1—shows a basic architecture of a multiprocessor computer system according to the invention, and FIG. 2—shows a multiprocessor computer system with virtual resources, and FIG. 3—shows communication in the event of a reservation request, and FIG. 4—shows a reservation request sequence, and FIG. 5—shows a specific example of a reservation request for a virtual embedded system in the form of a sequence diagram, and FIG. 6—shows a sequence diagram of a reservation of a virtual scratch-pad memory, and FIG. 7—shows the architecture of a network router.

The same reference symbols are used for corresponding elements in the drawings.

In the text below, the terms program, software program and application each mean programs of any type which can be executed on the computer system, in particular application programs and system programs.

The invention allows the time response of the system—in particular that of the memory hierarchy—to be made predictable for individual applications which are considered to be important, that is to say to isolate said applications from applications which are running at the same time, by dynamically managing resources. This makes it possible to execute applications which require an accurately predictable time response at the same time as other applications on a system with jointly used resources.

In this case, use is made of existing mechanisms for individual resources which improve the response in the event of access conflicts, for example by means of reservation or prioritization. These are now presented below:

Cache Memory

Some cache architectures make it possible to selectively simplify the time response of caches by means of reconfiguration (D2) or so-called cache locking (D3, D4), that is to say the holding of particular data in the cache. In this case, the cache then behaves like a software-managed memory. There are different methods with different advantages and disadvantages (circuit complexity, configuration overhead, locking granularity).

The mutual influence of programs which are executed at the same time can be achieved, in the case of a jointly used cache, by means of so-called cache partitioning (D5, D6), that is to say the permanent allocation of parts of the jointly used cache to particular processors or applications. There are numerous different approaches in this case too.

Specific embodiments of the invention may contain distributed caches. So-called "address mapping" can be used to control which addresses are assigned to which cache parts (D7). This functionality can be implemented in the communication medium.

Data Transfers

In particular when using scratch-pad memories, relatively large volumes of data are written to or read from the scratch-pad memory in the background using known or regular access patterns, often by means of the so-called direct memory access method (DMA). The corresponding control is undertaken in this case by a DMA controller (DMAC) which is in turn controlled by the application (D8). One advantageous development of the invention contains extended DMA controllers in the form of data transfer units (DTE). These weakly configurable units provide extended address patterns, for example 2D, 3D, 4D block transfers, scatter/gather lists, and the option of carrying out cache locking and partitioning.

Main Memory

Conflicts when accessing the main memory are handled in the main memory controller by means of special sequence planning, as a result of which the data rates of individual applications can be limited or access operations of particular applications can be prioritized (D9, D10). This makes it possible to guarantee the maximum latency and/or the minimum data throughput for selected applications within certain limits, Communication Medium In order to eliminate the influence of conflicts on the communication medium, there are, in particular in the field of embedded systems, networks-on-chip which support different qualities of service (QoS). These are generally implemented by prioritizing (D11, D12, D13) and/or reserving (D14, D15, D16) communication resources and make it possible to isolate communication processes which are taking place at the same time.

However, these mechanisms have the disadvantage that that communication process which does not impose any strict demands on the quality of service is discriminated against. In a processor system, this applies to the data traffic caused by desktop and server applications. However, discrimination against this traffic leads to requests being encumbered with a higher latency, which may greatly impair the throughput of these applications.

Therefore, one refinement of the invention comprises a specific embodiment of a communication medium which reduces these effects.

One advantageous development of the invention relates to a communication medium for a multiprocessor computer system, which communication medium may be, for example, in the form of a network integrated in a chip (network-on-chip). The time response of the communication medium can be adjusted in such a manner that background data traffic is given preferential treatment over data traffic with defined bandwidth requirements, and the communication medium can also be adjusted, by regulating the bandwidth, in such a manner that sufficient bandwidth is available for the data traffic with defined bandwidth requirements. A distinction is therefore made between general data traffic, which does not have any particular bandwidth requirements and is therefore referred to as background data traffic, and the data traffic with defined bandwidth requirements. The advantageous development of the invention allows such background data traffic to be handled even before data traffic with defined bandwidth requirements, depending on the system workload. For this purpose, the communication medium is adjusted to a particular bandwidth.

One exemplary embodiment of such a communication medium is an on-chip network in which communication takes place in a packet-based manner via a multiplicity of network routers which are arranged in a grid (mesh), for example. FIG. 7 shows a corresponding network router which supports three traffic classes: (1) guaranteed minimum bandwidth with upwardly restricted latency, (2) no guarantees but the shortest possible latency, (3) guaranteed maximum latency with upwardly restricted bandwidth. The special feature is the manner in which individual communication links are allocated. In this case, a known prioritization is first of all used inside the arbitration 705 in which separate buffers (virtual channels, cf. D17) 706, 707 and 708 are allocated to each traffic class. In order to guarantee a maximum latency, traffic class 3 is given preferential treatment. However, unlike the prior art, traffic class 2 is given preferential treatment over traffic class 1. In order to nevertheless be able to guarantee a minimum bandwidth, use is made of bandwidth limiters (traffic shapers, cf. D18) 709 which, when configured in a corresponding manner, restrict the bandwidth of traffic classes 2 and 3, with the result that sufficient bandwidth remains free on average in order to meet the requirements of traffic class 1. In this case, the traffic shapers are in the form of token bucket shapers. Unlike the prior art, the traffic shapers act at the respective output ports of the routers instead of at the input ports of the network, which allows the bandwidth to be precisely controlled on particular traffic routes.

In addition, the embodiment of the communication architecture, contained in one refinement of the invention, enables the address mapping described above. In this respect, the network adapters, that is to say the modules which connect network clients to the network, make it possible to convert address spaces to network addresses. This makes it possible to flexibly map addresses to network nodes and to thus map memory addresses to parts of the distributed cache memory (which can be used as a scratch-pad memory).

Centralized Resource Management

In the existing approaches described above, resource conflicts are each individually handled in the cache, main memory and communication medium. However, a plurality of resources are generally used together to perform a particular task. It is therefore necessary to coordinate the distribution of resources in order to accurately analyze the time response of access operations.

This is a multidimensional optimization problem. There are already a number of approaches (D19, D20, D21) for arrangements which are not distributed, that is to say for systems in which each resource class is present only once, but these approaches do not provide any real-time guarantees but rather concentrate on fair resource distribution or optimization of the total throughput. In addition, systems in which the resources are distributed are not dealt with there.

The invention makes it possible to integrate the above-described mechanisms by using a central resource manager.

FIG. 1 illustrates the basic architecture of a multiprocessor computer system which comprises the invention. In detail, said system contains a plurality of processors 102 which may each contain private cache memories, a plurality of jointly used cache tiles 103 which may each be spatially assigned to a processor 102, a central resource manager 101, one or more data transfer units (DTE) 105, one or more main memory controllers 106 which are intended to connect the main memory and may be implemented using a plurality of physically separate memory controllers, one or more input/output interfaces 107, optionally one or more hardware accelerators 108 of the same type or different types, and a jointly used communication medium 104 to which all components 101, 102, 103, 105, 106, 107 and 108 can be connected.

One specific embodiment of such an architecture may contain, for example, 64 processors with private level-1 caches, a level-2 cache distributed over 64 parts, two memory controllers, two I/O controllers and a resource manager which are connected via an 8×8 mesh network. The distributed cache supports cache locking and cache partitioning. The memory controllers implement priority controlled sequence planning with two priority classes LOW and NORMAL, with adjustable data rate limitation (traffic shaping) for the NORMAL class. The network supports three priorities LOW, NORMAL and HIGH which enable isolation by means of prioritization and distributed data rate limitation (traffic shaping). In addition, the network allows memory and network addresses to be flexibly assigned using address mapping.

Mechanisms for managing or reserving all jointly used resources, that is to say the memory or cache, communication medium, data transfer unit, memory controller and input/output unit, for example, are characteristic of any embodiment of a computer system in the sense of the invention. In any embodiment, a resource manager is attached to this infrastructure.

In the basic configuration, this system constitutes a symmetrical multiprocessor system (SMP) with non-uniform cache access (NUCA) and possibly non-uniform memory access (NUMA). In this case, all processors 102 can access the main memory 106 via cache memories 103 using a common address space.

Applications may now request particular services from the resource manager. These requests may be made in the form of virtual components with a defined time response. In this case, the resource manager configures all components, as illustrated, in FIG. 3: applications 403 (which are executed on one or more processors 102) make reservation requests 401. The resource manager processes such a reservation request by selecting suitable resources and the configuration of the latter. This selected configuration is then set in the individual components 103, 104, 105, 106, 107 and 108 involved using configuration messages 402 and/or configuration registers.

Advantageous types of reservation requests are listed and explained below.

Reservation of a Virtual Embedded System

In this case, the application 403 requests a virtual embedded system (as illustrated by way of example in FIG. 2) having virtual processors 302, scratch-pad memories 303, caches 103, virtual data transfer units (DTE) 305 and point-to-point links 304 and optionally input/output units 107 and hardware accelerators 108, each with desired minimum requirements and a defined time response. In such a request, the requesting application thus transmits a complete description of a virtual system, including the desired time response. This description comprises virtual processors 302 and/or hardware accelerators 108 with a defined execution rate, virtual software-managed memories 303 and/or caches 103 and/or main memories 106 with a defined capacity, access time and bandwidth, virtual data transfer units 305 and virtual point-to-point communication links 304 between the virtual and real components with defined maximum latencies and minimum data rates.

Each request 401 passes through a plurality of steps in the resource manager according to FIG. 4: a configuration or a corresponding configuration change is first of all created in step 501. In step 502, the resource manager first of all checks the feasibility of each configuration change. For this purpose, there is a system description (system model) in the form of a suitable data structure containing the existing system components and their capacity, current utilization and configuration and connection in the system. This description can be used to determine, for a system configuration matching a request, whether said configuration can be implemented with the currently available resources. If this is not the case, alternative configurations can be tried, if necessary, according to step 504 by selecting a different assignment of virtual scratch-pad memories to cache parts, for example. If it is possible to find such a configuration which can be implemented, this configuration is carried out by the resource manager in step 503. The resource manager can also use the system description to carry out an optimization process in step 501 before a configuration change is made in step 503. The communication resources required can thus be minimized, for example, by suitably selecting the processors and/or cache parts. Alternatively, it is possible to optimize the power consumption or performance of background applications.

Reservation requests may be provided with a priority. If in the case of a request with a particular priority, the resource manager determines in step 505 that said request cannot be satisfied on account of earlier requests with a lower priority, the resource manager can deprive the application(s) with a lower priority of the resources which have already been allocated in step 506 again, in which case a higher entity such as the operating system can be used to withdraw the reservation on the application side.

If a request cannot be satisfied on account of the available resources and there is no alternative configuration which can be implemented either, the resource manager notifies the requesting application of this in step 507. According to path 508, said application can then make an alternative request containing fewer resources of a particular class or less strict time requirements. For this purpose, the application can obtain the reason for rejection from the resource manager.

In order to release reserved resources again after an application has been concluded or in the case of requests with a higher priority, the resource manager logs each configuration change which has been made together with a reference to the request or application which has caused this configuration change.

The selection of a configuration is made using a system model and constitutes a multidimensional optimization problem. An efficient solution can therefore be carried out in a plurality of steps. The resource manager can first of all select and configure free processors, cache memories, hardware accelerators, data transfer units and memory controllers before the intermediate communication resources are configured according to the latency and bandwidth requirements in a second step.

The selected resources are reserved by the resource manager, as illustrated in FIG. 5. The resource manager accesses corresponding configuration interfaces of the involved resources, if necessary via a communication medium, as described by way of example below:

In order to incorporate the reserved memories in the address space of the involved components (processors and hardware accelerators), the address mapping of these components and of the affected network adapters is adjusted accordingly.

Cache memory is reserved using cache partitioning registers of the involved caches. In order to reserve cache parts as scratch-pad memories, said parts are blocked. In order to accelerate blocking on a cache line basis, the resource manager may be assisted by a data transfer unit which generates the corresponding requests for the caches in the background. In this case, the data transfer unit uses the previously adjusted address mapping. The data transfer unit reports the completion of the blocking operation to the resource manager.

Processors and hardware accelerators are reserved by means of the scheduling of the runtime environment and/or corresponding configuration registers.

Bandwidths and latencies of main memory access operations are controlled, for example, by means of corresponding configuration registers in the main memory controllers.

The resource manager logs the configuration changes which have been made together with the reservation request or a reference to the reserving application.

As soon as all resources have been reserved, the resource manager notifies the application or the runtime environment of this, whereupon the application can use the reserved virtual system.

Reservation of a Virtual Software-Managed Memory

In this case, the application 403 requests a virtual software-managed memory with a configurable size, maximum access latency and minimum access data rate.

The resource manager 101 satisfies such a request by selecting and blocking (locking) correspondingly large parts of the distributed cache memory 103. For this purpose, a data transfer unit can be used again to carry out the blocking operation in the background. The resource manager then configures the communication medium 104 in such a manner that the access latency and data rate are complied with.

FIG. 6 shows the method in detail using an example: the application 403 requests the resource manager 101 to provide a virtual scratch-pad memory, said request containing required parameters, namely capacity, access latency and access bandwidth, for cache memory to be reserved. In order to satisfy such a request, the resource manager selects one or more of the distributed cache parts 103 and reserves (or locks) correspondingly large parts (illustrated here without the involvement of the data transfer unit). The resource manager additionally configures the priorities and bandwidth limiters in the communication medium 104 such that the desired access latency and bandwidth between the processors of the requesting application and the reserved cache memories are ensured. In this step, the address conversion which may be implemented in the communication medium is also adjusted in such a manner that the reserved cache memories are incorporated in the address space of the requesting application.

Transferring Data in the Background

In this case, the application 403 requests a data transfer in the background with configurable source and destination address patterns and a latest completion time. The resource manager 101 satisfies such a request by determining the source, the destination and the volume of data to be transmitted from source and destination address patterns. The resource manager determines the average data rate required from the volume of data and the latest completion time and then configures the communication medium 104 between the source and the destination in a corresponding manner. The resource manager now selects a suitable data transfer unit 105 and configures the latter in such a manner that the desired data transfer is carried out.

BIBLIOGRAPHY

D1 "Efficient Utilization of Scratch-Pad Memory in Embedded Processor Application", Panda, P. R. and Dutt, N. D. and Nicolau, A., Proceedings of the 1997 European conference on Design and Test, 1997, pages 7-11

D2 EP0000009.99500A1

D3 "Data cache locking for higher program predictability", Vera, X. and Lisper, B. and Xue, J., Proceedings of the 2003 ACM SIGMETRICS international conference on Measurement and modeling of computer systems, 2003, pages 272-282

D4 EP000000459233A3

D5 EP000001163193B1

D6 "Achieving Predictable Performance with On-Chip Shared L2 Caches for Manycore-Based Real-Time Systems", Cho, S. and Jin. L. and Lee, K., 13th IEEE International Conference on Embedded and Real-Time Computing Systems and Applications, 2007, pages 3-11

D7 Lei Jin, Hyunjin Lee, Sangyeun Cho (University of Pittsburgh): "A flexible data to L2 cache mapping approach for future multicore processors", Proceedings of the 2006 workshop on Memory system performance and correctness

D8 EP000000486145A2

D9 "Predator: a predictable SDRAM memory controller", Akesson, B. and Goossens, K. and Ringhofer, M., Proceedings of the 5th IEEE/ACM international conference on Hardware/software codesign and system synthesis, 2007, pages 251-256

D10 "Traffic shaping for an FPGA based SDRAM controller with complex QoS requirements", Heithecker, S. and Ernst, R., Design Automation Conference, 2005. Proceedings. 42nd, 2005, pages 575-578

D11 E. Bolotin, I. Cidon, R. Ginosar, and A. Kolodny, "QNoC: QoS architecture and design process for network on chip", J. Syst. Archit., vol. 50, no. 2-3, pp. 105-128, 2004

D12 N. Kavaldjiev, G. Smit, P. Jansen, and P. Wolkotte, "A Virtual Channel Network-on-Chip for GT and BE traffic", IEEE ISVLSI D13 T. Bjerregaard, The MANGO clockless network-on-chip: concepts and implementation. IMM, Danmarks Tekniske Universitet, 2005

D14 K. Goossens, J. Dielissen, and A. Radulescu, "Ethereal Network on Chip: Concepts, Architectures, and Implementations", IEEE DESIGN & TEST, pp. 414-421, 2005

D15 T. M. Marescaux, Mapping and management of communication services on MP-SoC platforms, Technische Universiteit Eindhoven, 2007

D16 Wentzlaff, D. and Griffin, P. and Hoffmann, H. and Bao, L. and Edwards, B. and Ramey, C. and Mattina, M. and Miao, C. C. and Brown III, J. F. and Agarwal, A., "On-Chip Interconnection Architecture of the Tile Processor", IEEE Micro 5-2007

D17 William J. Daily, Brian Patrick Towles, "Principles and Practices of Interconnection Networks", page 239 ff., Morgan Kaufman, 2003, ISBN: 978-0122007514

D18 Andrew S. Tanenbaum, "Computer Networks, Fourth Edition", page 399 ff., Prentice Hall PTR, 2002, ISBN: 978-0130661029

D19 R. Iyer et al., "QoS policies and architecture for cache/memory in CMP platforms", SIGMETRICS '07 Conference Proceedings; 2007

D20 Fei Guo, Yan Solihin, Li Zhao, Ravishankar Iyer, "A Framework for Providing Quality of Service in Chip Multi-Processors", Proceedings of the 40th Annual IEEE/ACM International Symposium on Microarchitecture, 2007

D21 R. Bitirgen, E. Ipek, J. F. Martinez, "Coordinated Management of Multiple Interacting Resources in Chip Multiprocessors: A Machine Learning Approach", Proceedings of the 41st Annual IEEE/ACM International Symposium on Microarchitecture, 2008.

The invention claimed is:

1. A method for operating a multiprocessor computer system comprising at least two microprocessors; hardware resources which are jointly used by said at least two microprocessors; a program which is able to be executed on said multiprocessor computer system; and a resource manager, which is implemented as a hardware component to perform steps of:
    managing said hardware resources, wherein said hardware resources are assigned to said resource manager;
    receiving and processing a reservation request for reserving said hardware resources, wherein said reservation request is transmitted by said program and describes virtual resources and at least a desired type, a desired scope and a desired time response of each of said virtual resources;
    automatically selecting and allocating said hardware resources, which are needed to satisfy said reservation request, to said program if said hardware resources are available; and
    adjusting a time response of each of said allocated hardware resources and a communication medium through which said at least two microprocessors and said hardware resources are connected according to said desired time response requested with said reservation request,
    wherein said time response of said communication medium is adjusted in such a manner that background data traffic is given priority over data traffic with defined bandwidth requirements, whereby said communication medium is adjusted by regulating a bandwidth of said communication medium in such a manner that sufficient bandwidth is remaining for the data traffic with defined bandwidth requirements.

2. The method according to claim 1, wherein said resource manager has a system model which describes the type, scope and time response of at least said hardware resources managed by said resource manager.

3. The method according to claim 1, wherein said virtual resources contain virtual scratch-pad memories with data transfer units.

4. The method according to claim 1, wherein said hardware resources managed by said resource manager have at least one selected from the group consisting of a memory, a memory controller, a hardware accelerator, a cache memory, a data transfer unit and an input/output unit.

5. The method according to claim 4, wherein said resource manager is further implemented to perform the step of optimizing said communication medium required when selecting said hardware resources to be reserved.

6. The method according to claim 1, wherein said resource manager is further implemented to perform the steps of logging said reservation request and logging a change in-configuration of said hardware resources as a result of processing said reservation request.

7. The method according to claim 1, wherein said resource manager is further implemented to perform the steps of receiving a cancellation notification and canceling said reservation request upon receiving said cancellation notification.

8. The method according to claim 7, wherein said cancellation notification is received from at least one selected from the group consisting of said program and a superordinate entity.

9. The method according to claim 8, wherein said superordinate entity is selected from the group consisting of a runtime environment and an operating system.

10. The method according to claim 1, wherein said resource manager is further implemented to perform the step of rejecting said reservation request which is not satisfied.

11. The method according to claim 10, wherein said reservation request is not satisfied on account of a workload of said multiprocessor computer system.

12. The method according to claim 10, wherein said resource manager is further implemented to perform the step of notifying said program of a cause of rejection if said reservation request is rejected.

13. The method according to claim 12, wherein said resource manager is further implemented to perform the steps of receiving and processing an alternative reservation request transmitted by said program, wherein said alternative reservation request is satisfied with regard to said cause of rejection.

14. The method according to claim 1, wherein said reservation request contains an item of priority information, and said resource manager is further implemented to perform the steps of receiving said item of priority information, canceling an already granted reservation requested by a previous program which has a lower priority than said reservation request in order to satisfy said reservation request, and notifying said previous program of said cancellation of said already granted reservation.

15. The method according to claim 1, wherein said resource manager is further implemented to perform the step of communicating with at least one data transfer unit which transports data between components of said multiprocessor computer system in a background of said multiprocessor computer system.

16. The method according to claim 1, wherein said resource manager is further implemented to perform the step of accessing a programmable data transfer unit, wherein said programmable data transfer unit contains extended address patterns and an option to transmit particular configurations to individual system components of said multiprocessor computer system in a background of said multiprocessor computer system, and assists said resource manager when adjusting said time response of each of said hardware resources.

17. The method according to claim 1, wherein said communication medium is a network integrated in a chip.

18. A multiprocessor computer system comprising:
at least two microprocessors;
hardware resources which are jointly used by said at least two microprocessors;
a program which is able to be executed on said multiprocessor computer system; and
a resource manager, which is implemented as a hardware component, to:
 manage said hardware resources, wherein said hardware resources are assigned to said resource manager;
 receive and process a reservation request for reserving said hardware resources, wherein said reservation request is transmitted by said program and describes virtual resources and at least a desired type, a desired scope and a desired time response of each of said virtual resources;
 automatically select and allocate said hardware resources, which are needed to satisfy said reservation request, to said program if said hardware resources are available; and
 adjust a time response of each of said allocated hardware resources and a communication medium through which said at least two microprocessors and said hardware resources are connected according to said desired time response requested with said reservation request,
wherein said time response of said communication medium is adjusted in such a manner that background data traffic is given priority over data traffic with defined bandwidth requirements, whereby said communication medium is adjusted by regulating a bandwidth of said communication medium in such a manner that sufficient bandwidth is remaining for the data traffic with defined bandwidth requirements.

19. The multiprocessor computer system according to claim 18, wherein said communication medium is a network integrated in a chip.

* * * * *